US006893264B2

(12) United States Patent
Reed

(10) Patent No.: US 6,893,264 B2
(45) Date of Patent: May 17, 2005

(54) PROFESSIONAL EDUCATIONAL GAME

(76) Inventor: Martha E. Reed, 742 Washington Park, #A5, Norfolk, VA (US) 23417

( * ) Notice: Subject to any disclaimer, the term of this patent is extended or adjusted under 35 U.S.C. 154(b) by 21 days.

(21) Appl. No.: 10/367,804

(22) Filed: Feb. 19, 2003

(65) Prior Publication Data

US 2004/0161729 A1 Aug. 19, 2004

(51) Int. Cl.⁷ .............................................. G09B 19/22
(52) U.S. Cl. ...................... 434/128; 273/236; 273/287; 273/430; 273/431
(58) Field of Search ................................ 434/128, 129, 434/107, 154, 219; 273/139, 236, 243, 249–254, 273, 278, 279, 287, 429–432

(56) References Cited

U.S. PATENT DOCUMENTS

| | | | |
|---|---|---|---|
| 3,224,112 A | | 12/1965 | Hanson |
| 3,543,418 A | | 12/1970 | Press |
| 3,731,935 A | * | 5/1973 | Moore, Jr. ................. 273/270 |
| 4,136,879 A | | 1/1979 | Andrew et al. |
| 4,326,711 A | | 4/1982 | Giallombardo |
| 4,372,559 A | | 2/1983 | Summers |
| 4,561,658 A | * | 12/1985 | Peterson .................... 273/243 |
| 4,854,594 A | * | 8/1989 | Eaton ......................... 273/249 |
| 5,062,645 A | | 11/1991 | Goodman et al. |
| 5,120,066 A | * | 6/1992 | Cohen ........................ 273/258 |
| 5,197,884 A | | 3/1993 | Roemer, Jr. et al. |
| 5,257,939 A | | 11/1993 | Robinson et al. |
| 5,326,269 A | | 7/1994 | Kalik et al. |
| 5,454,569 A | | 10/1995 | Walker |
| 5,556,100 A | | 9/1996 | Taylor et al. |
| 5,624,120 A | * | 4/1997 | Frank-Opigo ............... 273/279 |
| 5,660,389 A | | 8/1997 | Freda, III |
| 6,019,370 A | * | 2/2000 | Morris ....................... 273/249 |
| 6,070,874 A | | 6/2000 | Ivers |
| 6,102,398 A | * | 8/2000 | Kolleth ....................... 273/252 |
| 6,171,188 B1 | | 1/2001 | Elstner |
| 6,224,056 B1 | | 5/2001 | Jones |
| 6,279,908 B1 | | 8/2001 | Hunsberger |
| 6,402,145 B1 | * | 6/2002 | Iglesias ..................... 273/243 |
| 2002/0101032 A1 | | 8/2002 | Buerk |

FOREIGN PATENT DOCUMENTS

| | | |
|---|---|---|
| FR | 2530479 | 1/1984 |
| FR | 2653256 | 4/1991 |
| GB | 2084027 | 4/1982 |

OTHER PUBLICATIONS

Jeopardy Board Game (Amazon listing), 2000<retireved online Mar. 17, 2004>.*
www.sonypictures.com Printout from Website Dated Aug. 9, 2002, History and Background of the "Jeopardy!" Television Game Show.
http://userdata.acd.net Printout from Website Dated Aug. 9, 2002, TV Game Show Home Page Including Information on the "Jeopardy!" Televisions Game Show.

* cited by examiner

Primary Examiner—Kurt Fernstrom
(74) Attorney, Agent, or Firm—Richard C. Litman

(57) ABSTRACT

A professional educational game provides continuing education for the staff and others in a professional environment. Players play independently of one another as their schedules permit. A round of the game may extend for a few days, up to a few weeks. A relatively large game board includes a series of cover flaps attached thereto. Each flap conceals a statement relating to the profession of the players; statements are preferably in the form of a response to a question. The statements are preferably arranged in a matrix according to subject area and degree of difficulty. Players take one or more response sheets from a receptacle, lift the cover flap(s) to the statement(s) or question(s) selected, and note their response(s) to the statement(s) or question(s) on their response sheet(s). The game organizer may provide one or more prizes for the top placing player or players, at the end of each round.

19 Claims, 4 Drawing Sheets

ANSWER SHEET

50 NAME  54 TIME  52 DATE

CATEGORY

56

DOLLAR AMOUNT

58

AND THE QUESTION IS...

PROFESSIONAL EDUCATIONAL GAME

BACKGROUND OF THE INVENTION

1. Field of the Invention

The present invention relates generally to board games and the like which test the knowledge of the players, and more specifically to an open structure game for testing and challenging the knowledge of the players or participants. The present game is particularly well adapted for placement in a professional environment, where players or participants may participate in the game independently of one another when able or as desired.

2. Description of the Related Art

The relatively rapid advance of knowledge in many professional fields, has resulted in requirements in many jurisdictions for continuing education for various professionals. Such requirements are generally issued by the licensing boards of various states and primarily affect the medical, teaching, and legal professions, but may require persons in other professions (e.g., engineering, architecture, etc.) to receive some minimum number of hours of additional training in some period of time, e.g., yearly, biennially, etc.

While many persons engaged in some of these professions do not find it unduly difficult to meet the minimum standards for continuing training, it can be difficult for professionals in other fields to find the time and money required. This is particularly true in the nursing profession, where the long hours and relatively low pay in comparison to many other professional fields, can make it difficult for nurses to be able to afford the time and finances required for such additional training.

Yet, it is widely recognized that continuing education for professionals in various fields is important, and even critical in certain fields. This is particularly true in the medical profession, where technological advances seem to occur at an ever increasing rate. It is widely recognized that nurse practitioners must be as knowledgeable in their fields as medical doctors. Yet, with nursing shortages being a commonplace occurrence, and the relatively lower pay scales for nurses, it can be difficult for those engaged in the nursing profession to find the time and money to meet the continuing education or training standards generally required of them. This is truly a shame, because the vast majority of these professionals are involved in their chosen field because of a deep interest in the profession, and they recognize the need for continuing training or education. Yet, many leave the profession due to the excessive demands upon their time and schedules, one of those demands being the time required for continuing training.

The present invention provides a solution to this problem by means of a professional educational game which may be played by staff personnel in the professional environment. The present professional educational game is patterned loosely after the well known television game show Jeopardy!®, but rather than being a closed game in which only a limited number of contestants (i.e., two) play during a previously established time period, the present game is considerably more open and permits anyone who is physically present at any time during the course of the game, to play. The present game is also more open in the sense that a single game may continue for days or weeks, thus permitting those assigned to different shifts and/or different days of the week, to participate. The present professional educational game provides an enjoyable means for professionals to test and further their knowledge in their chosen field, without requiring inordinate amounts of time and/or money from those who engage in the present game.

A discussion of the related art of which the present inventor is aware, and its differences and distinctions from the present invention, is provided below.

U.S. Pat. No. 3,224,112 issued on Dec. 21, 1965 to John R. Hanson, titled "Card Holder With Movable Shutters And Interchangeable Cards For Insertion Therein And A Second Card Holder With A Spinner And Interchangeable Cards," describes a pair of embodiments of question and answer games. In one embodiment, a question and answer game includes a series of question cards which are interchangeably placed within a holder. Each card position is covered by an openable slide to conceal the question until viewing of the card is desired. Hanson does not describe any particular rules of play for his game embodiments, nor does he describe how one can win the game, i.e., higher percentage of correct answers, more correct answers in a given period of time, etc. Moreover, Hanson does not disclose any provision for a series of questions having different levels of difficulty, and different rewards for correctly answering such questions of different difficulty levels. The present invention provides a different structure for the game board, as well as different levels of difficulty for questions and rules for competitive play.

U.S. Pat. No. 3,543,418 issued on Dec. 1, 1970 to Jay L. Press, titled "Intelligence Testing Device," describes a device having an array of lights, each of which may be illuminated individually to form a pattern. A partial pattern is illuminated, with the user then being required to illuminate one or more lights to complete the pattern properly. No questions are provided by Press to test or challenge the knowledge of the user or player. The Press device is not actually a competitive game, nor does it lend itself to open play among a relatively large number of players and over a relatively long span of time, as does the present professional education game.

U.S. Pat. No. 4,136,879 issued on Jan. 30, 1979 to Clifford G. Andrew et al., titled "Intern Board Game," describes a board game having a peripheral playing path which must be traveled by playing pieces assigned to the players. A series of cards are provided, with each of the cards including symptoms and on one side of the cards, an appropriate diagnosis. Andrew et al. provide for an advanced form of play for their game, in which players must provide the proper diagnosis for the symptoms on the cards as they are encountered during play. However, the Andrew et al. game is a structured tabletop type board game, in which a plurality of players must play simultaneously, rather than being an open ended game in which players may participate independently of one another at different times, as in the present game. Andrew et al. also make no mention of providing questions having different levels of difficulty, as is the case with the present game.

U.S. Pat. No. 4,326,711 issued on Apr. 27, 1982 to Gary P. Giallombardo, titled "Question And Answer Game Employing Chance-Taking Means," describes a television trivia type game, in which a large number of questions are divided into several different subject areas. A random selection device (spinner) is used to select the questions at each turn. Rewards in the form of simulated currency are provided for players answering the questions correctly. The random question selection means of the Giallombardo game, precludes the selection by players of questions according to topic and degree of difficulty. In contrast, while players of the present game do not know the specific question beforehand, they are allowed to select the general subject area and degree of difficulty in order to determine the question to be selected.

U.S. Pat. No. 4,372,559 issued on Feb. 8, 1983 to Ann Summers, titled "Educational Game For Student And/Or Graduate Nurses," describes a tabletop type board game having a generally conventional layout and rules of play. A series of loose cards are provided, each of which contains a question and a series of answers. The correct response is provided on the opposite side of each card. Players advance playing pieces along a playing path on the board, in accordance with correct responses to the questions on the cards. The Summers game is not open, as is the present game, i.e., Summers requires all players to participate simultaneously and to be physically present at the location of the game board. Moreover, the present game does not measure the progress of players by movement of pieces about a playing path, but rather gauges their achievements according to the accuracy of the responses they provide to questions or statements on the game board during the relatively long period of time in which the game is open or in play.

U.S. Pat. No. 5,062,645 issued on Nov. 5, 1991 to Meri Goodman et al., titled "Fitness And Nutrition Game Apparatus And Method Of Play," describes a game having a game board with a sinusoidal playing path thereon. Advance along the playing path is accomplished by correctly answering questions relating to nutrition, with those questions being provided on a series of loose cards. Players may exchange playing pieces representing more fit body images, in accordance with correct responses to more advanced questions. The Goodman et al. game is generally conventional in its layout and play, and does not provide open ended play by individual participants in accordance with their own schedules and time over a relatively long period, as provided by the present game.

U.S. Pat. No. 5,197,884 issued on Mar. 30, 1993 to James W. Roemer, Jr. et al., titled "Question And Answer Game For Stimulating Interest In News Periodicals," describes a game in which a series of loose cards contain questions relating to items commonly found in newspapers. Players draw cards sequentially and look up the correct response to the questions, noting a letter on the card when they arrive at a correct response. The first player or team to collect all of the letters (e.g., "newsbeat,") wins the game. In contrast, the questions of the present game remain physically attached to the game board; play is open, with players participating in accordance with their own schedules as desired; and the winner is determined in accordance with the number and level of difficulty of questions selected and correctly answered.

U.S. Pat. No. 5,257,939 issued on Nov. 2, 1993 to Don T. Robinson et al., titled "Cultural Knowledge Board Game," describes a game having a series of identical topic areas, with one being assigned to each player. Players draw loose cards randomly, and must explain or respond to the topic noted on the card, to the satisfaction of other players and in a given time period. A successful response allows the player to place a marker on the specific topic of his playing area of the board. No open play is provided by Robinson et al., nor do they disclose any differentiation of questions according to level of difficulty or value, as provided by the present game.

U.S. Pat. No. 5,326,269 issued on Jul. 5, 1994 to Maurice S. Kalik et al., titled "Scramble-Circuited Quiz-Module W/Overlaying Q&A-Sheets," describes an electronic game having a series of apertures in a game board, with a series of correspondingly apertured overlays selectively installable over the surface of the game board. The overlays contain a series of matching type questions, with the player being required to select appropriate matches by means of a pair of probes which are inserted into the apertures. The Kalik et al. game may only be played by a single individual at any given time, and does not provide a series of essay type questions requiring written responses, as in the case of the present professional educational game.

U.S. Pat. No. 5,454,569 issued on Oct. 3, 1995 to Donald P. Walker, titled "Afro American Educational Quiz Game," describes a game board having essentially conventional rules of play. The game is played by a number of players simultaneously, with the game board having a series of numbers for each player. The numbers correspond to cards, each of which contains a picture and short biography of a famous black person. Players must correctly identify the person on the card in order to receive points. The player collecting the greatest number of points after all question cards have been used, wins the game. The Walker game contrasts with the present game in that the present game is open, and any player or players may participate at any time without being restricted to a specific time period for play. Moreover, the present game provides a series of questions having different levels of difficulty, with correspondingly greater rewards or credits for responding to more difficult questions.

U.S. Pat. No. 5,556,100 issued on Sep. 17, 1996 to Mark E. Taylor et al., titled "Game Of The Immune System," describes a tabletop type board game in which a series of players simultaneously attempt to advance position markers along a path on the game board. Cards representing various contagious diseases are drawn, with players being delayed due to the need for recovery time from these diseases. Players gain simulated immunity from various diseases as play progresses, enabling them to progress more rapidly toward the goal to win the game. The Taylor et al. game differs considerably from the present game, in that the present game provides for open ended play by any number of players at different times as desired. Moreover, the present game challenges and tests the knowledge of players through a series of questions relating to professional knowledge in the players' occupational field. No chance means of any sort is utilized in the play of the present professional education game.

U.S. Pat. No. 5,660,389 issued on Aug. 26, 1997 to Donald R. Freda III, titled "History Based Trivia Game With Weighted Scoring System," describes a game in which the game board comprises a year long calendar. Players advance across the board in accordance with correct answers to trivia questions in a variety of subject areas. Partial credit may be provided for responses which are close to the specifically correct date. The Freda III game has a generally conventional configuration, in that markers must be advanced across a game board and play must be accomplished simultaneously by all players involved. The open play of the present game, in which players may play at any time they like, independently of other players, differs considerably from the Freda III game.

U.S. Pat. No. 6,070,874 issued on Jun. 6, 2000 to Thomas P. Ivers, titled "Quizzor Question And Answer Game Method And Associated Items," describes a trivia game in which players may wager on the outcome of each response by the responding player. Odds are provided relating to the difficulty of each question, with the responding player wagering on whether he or she will be able to answer the question correctly. Other players place similar wagers on the responding player's ability. Players win or lose the wagered amount as multiplied by the odds, and depending upon whether the question was answered correctly and whether the non-responding players wagered that the responding player would or would not respond correctly. As the players are wagering during the play of the Ivers game, all players must participate simultaneously. In contrast, the present game permits independent play by each player according to his or her own schedule; interaction between players is not required in the present professional education game.

U.S. Pat. No. 6,171,188 issued on Jan. 9, 2001 to Thomas Elstner, titled "Game Device For An Entertainment Show," describes a lighting or display system for a television game show in which a series of players participate. Each player resides before a background, with activation of a response switch by the is player resulting in a change in the color of the background for that player. The Elstner system facilitates identification of the player first responding when a question is asked. There is no motivation to combine the Elstner system with any aspect of the present invention, as the present game is not played simultaneously by a plurality of players, nor is there any benefit in the present game for being the first player to respond to a specific question. Elstner does not disclose any specific rules of play for a game other than the general procedure outlined immediately above, which is known for television game shows.

U.S. Pat. No. 6,224,056 issued on May 1, 2001 to Christopher D. Jones, titled "Educational Board Game And Method For Teaching Occupational Skills," describes a tabletop type board game in which the game board includes a series of playing paths thereon. Advance of playing pieces along the paths of the game board is accomplished by successfully answering a series of questions provided on loose cards with the game. While the Jones game is directed to professional (specifically, military) advancement, Jones does not provide an open ended game in which a plurality of players may participate independently of one another, with all questions being physically attached to the game board, as in the present professional educational game.

U.S. Pat. No. 6,279,908 issued on Aug. 28, 2001 to Glenn E. Hunsberger, titled "Diabetes Mellitus Game," describes a tabletop type board game having a generally spiral configuration playing path thereon. A series of cards are provided, each having a question and corresponding answer associated with the illness of diabetes. Players are penalized for incorrect responses, by being required to simulate some symptom (s) of the illness. As in the case of other board games discussed further above, the Hunsberger game requires all players to participate simultaneously, unlike the present professional educational game.

U.S. Patent Publication No. 2002/101,032 published on Aug. 1, 2002 to Harold Buerk, titled "Senior Health Care Board Game," describes a tabletop type board game having two concentric playing paths. Movement of player position markers along the outer path is determined by dice, with various positions directing the player to draw a card periodically. The cards contain good or bad fortune regarding some illness or infirmity, and determine advance or setback of another position marker along the inner path. A player must move both of his or her markers completely around both playing paths, in order to win. The Buerk game does not require any knowledge to win, but rather is based upon pure chance. Moreover, all players must be present simultaneously for play. The present game has no luck or chance element, but tests the knowledge of the players as they play independently of one another.

British Patent Publication No. 2,084,027 published on Apr. 7, 1982 to Osmar S. De Almeida-Santos, titled "Medical Board Game," describes a tabletop type board game in which a number of players are each assigned a different medical specialty. Each player is also assigned a number of simulated patients. The goal of each player is to be the first to discharge all of his or her patients, through proper treatment, transfer to another specialist, or through the death of the simulated patient. As in the other board games known to the present inventor, the De Almeida-Santos game requires all players to participate simultaneously, with each player's play being at least somewhat dependent upon the participation of other players. The present game is relatively open ended in comparison, as has been noted further above. Players in the present game test their knowledge by responding to questions independently of one another, as their time and schedules permit. No movement or advance of markers about a game board is involved in the present game.

French Patent Publication No. 2,530,479 published on Jan. 27, 1984 to Michele Lafay, titled "Educational Aid For Health Education," describes (according to the drawings and English abstract) a training system or game wherein a series of cards pictorially shows various health situations and problems. The abstract states that the game or system may be used for educating illiterate persons, as no reading is required. However, no rules of play are described in the English abstract or shown in the drawings. The game or training system of the '479 French Patent Publication does not appear to be related to the present game, with its single game board and series of concealed questions secured thereto, for independent play by a number of players.

French Patent Publication No. 2,653,256 published on Apr. 19, 1991 to Pierre Carrillo et al., titled "Parlour Game For Preparing For Exams And Aid To Medical Studies," describes (according to the English abstract; no drawings are provided) a game including a series of question and answer cards relating to different areas of medicine. Correct responses to the questions allow players to move position markers about a map of Africa. Other cards simulate the consumption of resources (water) and receipt and disposal of income. The game of the '256 French Patent Publication is thus more closely related to other conventional tabletop type board games, with their playing paths and position markers requiring simultaneous play by all players involved, than it is to the present game with its single game board and plurality of concealed questions allowing independent response by players at different times, as desired.

A printout from the website www.sonypictures.com, dated Aug. 9, 2002, describes the basic background and some history behind the Jeopardy!® television show. The sonypictures.com website printout notes that the basic concept of the answer-question format is used by many teachers as an entertaining means of testing their students and encouraging them to learn. No disclosure is made of the specific rules of play for the television (or other) Jeopardy! game, in the sonypictures.com printout.

Finally, a printout from the website http://userdata.acd.net, dated Aug. 9, 2002, describes a series of "parlor" type games and other materials based upon various television game shows. This printout is essentially a review of collectible materials and articles available and which are based upon various television game shows, including Jeopardy!. No disclosure is made of the specific rules of play for the television (or other) Jeopardy! game, in the userdata.acd-.net printout.

None of the above inventions and patents, taken either singly or in combination, is seen to describe the instant invention as claimed. Thus a professional educational game solving the aforementioned problems is desired.

SUMMARY OF THE INVENTION

The present invention comprises a professional educational game, intended for placement in the workplace or other area frequented by a professional staff. The present game has a relatively open structure, in that players may participate over a relatively long period of time (days, or perhaps even a few weeks) independently of one another, as their time permits. The game includes a large game board having a series of statements thereon, with the statements separated into a series of categories and arranged in order of the degree of difficulty. Other information, e.g. rules of play, notes describing the beginning and ending date for the round of play, etc., may be provided on the board. Each of the statements is concealed by a separate cover flap attached to the board, with the cover flap being lifted by the player who wishes to respond to the statement. A series of response sheets is also provided, along with a receptacle for players to place completed response sheets therein.

The concealed statements may be in the form of responses to questions relating to various aspects of knowledge required by the professionals participating in the game, with players being required to respond in the form of a question. This format is well known, having been developed for the Jeopardy!® television game show. However, more conventional formats in which each of the concealed statements comprises a question, with players being required to note a statement as a response, may be used with the present game as desired. The winning player or highest placing few players at the end of each round of play may be provided with a prize or award, if so desired.

Accordingly, it is a principal object of the invention to provide a professional educational game having an open structure for play in the office or other professional environment, for encouraging professionals to advance their knowledge levels in their profession.

It is an additional object of the present invention to provide such a professional educational game in which players play independently of one another, as their time and schedules permit.

It is another object of the invention to provide such a professional educational game comprising a large game board having a plurality of questions or statements thereon, with each of the questions or statements being concealed by a movable cover.

It is a further object of the invention to provide such a professional educational game wherein the questions or statements are arranged in a matrix of different categories and degrees of difficulty.

Still another object of the invention is to provide additional accessories for the play of the game by a series of players, with the accessories comprising at least a series of response sheets for use by the players, a description of the rules of play, a receptacle for completed response sheets, and notes relating to the duration of the round of play.

Another object of the invention is to provide supplemental lighting for the game board, as an option to be incorporated as desired.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 3 is a top plan view of an exemplary response sheet which may be used with the present professional educational game.

Similar reference characters denote corresponding features consistently throughout the attached drawings.

DETAILED DESCRIPTION OF THE PREFERRED EMBODIMENTS

The present invention comprises a professional educational game, for providing a professional staff or workforce with an enjoyable means of increasing their professional knowledge in their field. The exemplary embodiment described below is directed specifically to the nursing profession, but it will be seen that the present professional educational game may be formatted with questions or statements and responses tailored to virtually any professional field, as desired. The present game is particularly well suited for play in professions where continuing training is required or desired, e.g., nursing and other medical fields, the legal profession, engineering, architecture, aviation, etc. The applicability of the present professional educational game is limited only by the subject areas of the statements or questions and their corresponding responses which may be developed for the game.

Figure 1:
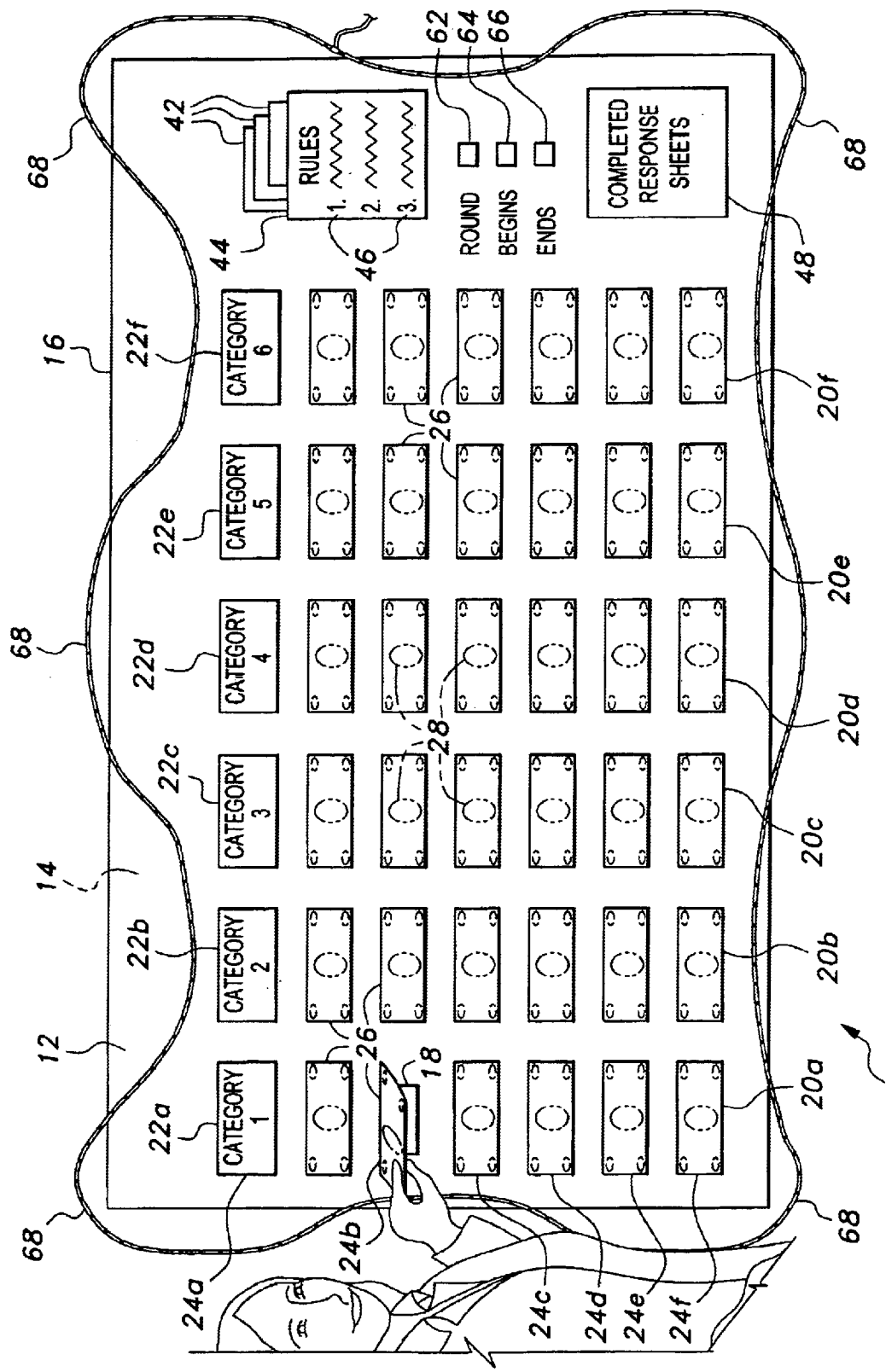
FIG. 1 is an environmental, front elevation view of a game board apparatus for a professional educational game according to the present invention, showing various features and details thereof.

FIG. 1 of the drawings provides an illustration of an exemplary game board 10 of the present game invention. The present game is intended as an open, unstructured game, in that players may participate at any time as desired in accordance with their schedules. The game board comprises a relatively large, flat board or sheet of material having a front surface 12, a back surface 14 opposite the front surface 12, and a peripheral edge or border 16. The game board 10 of the present game is preferably at least a few feet in each dimension, and configured for vertical placement adjacent a wall or the like, somewhat as shown in FIG. 1. While other configurations may be used, the relatively large size, e.g., some several feet in horizontal span, permits more than one player at a time to access the information on the board 10, and is more readily noticeable in order to encourage people to play.

A plurality of statements or questions 18 is disposed over the front surface of the board 10, preferably in a generally rectangular matrix as shown generally in FIG. 1. These statements or questions 18 preferably comprise a series of different subject areas with differing degrees of difficulty and are preferably provided in the form of a statement, to which the player must formulate a response in the form of a question. This is essentially the format of the formal television game show Jeopardy!®. However, the present game has a relatively open structure, in that players need not assemble at any specific time, but may play the present game as their own schedules and shifts permit. The specific number of rows and columns of statements 18 may vary as desired. In the exemplary game board 10 of FIG. 1, a series of six columns 20a through 20f are provided, with each of the columns containing a series of statements 18 in a different subject area or category from one another. Each of the columns 20a through 20f is headed by a title statement, respectively 22a through 22f, which briefly describes the subject area of the statements 18 of the corresponding columns 20a through 20f. Examples of the statements 18 and possible responses thereto, as well as exemplary title statements, are provided further below.

The statements 18 may also be categorized according to their degree of difficulty, with differing degrees of difficulty being placed in different horizontal rows across the board 10. In the exemplary board illustrated in FIG. 1, a series of six statements 18 are provided in each row, with the rows being designated as rows 24a through 24f. The rows may be in either ascending or descending order of difficulty, as desired. Points are accrued by players in accordance with the degree of difficulty of each statement correctly responded to by the individual players, with the person in charge of the game totaling up the points of each player at the end of each round to determine the winner of each round.

Each of the statements 18 is preferably normally covered or concealed by a liftable cover flap 26, with the cover flaps 26 of each horizontal row 24a through 24f preferably providing some indication of the relative degree of difficulty of the corresponding statement 18 concealed thereunder. For example, the cover flaps may have representations of different denominations of simulated paper money or currency thereon, as indicated by the broken line patterns 28 on the cover flaps 26 in FIGS. 1 and 2. The denominations are preferably arranged in corresponding order to the differing degrees of difficulty of the statements 18 of each row 24a through 24f, i.e., cover flaps 26 having representations of larger currency denominations being placed over statements 18 of greater difficulty, and cover flaps 26 representing a lower currency value, placed over less difficult statements 18.

Figure 2:
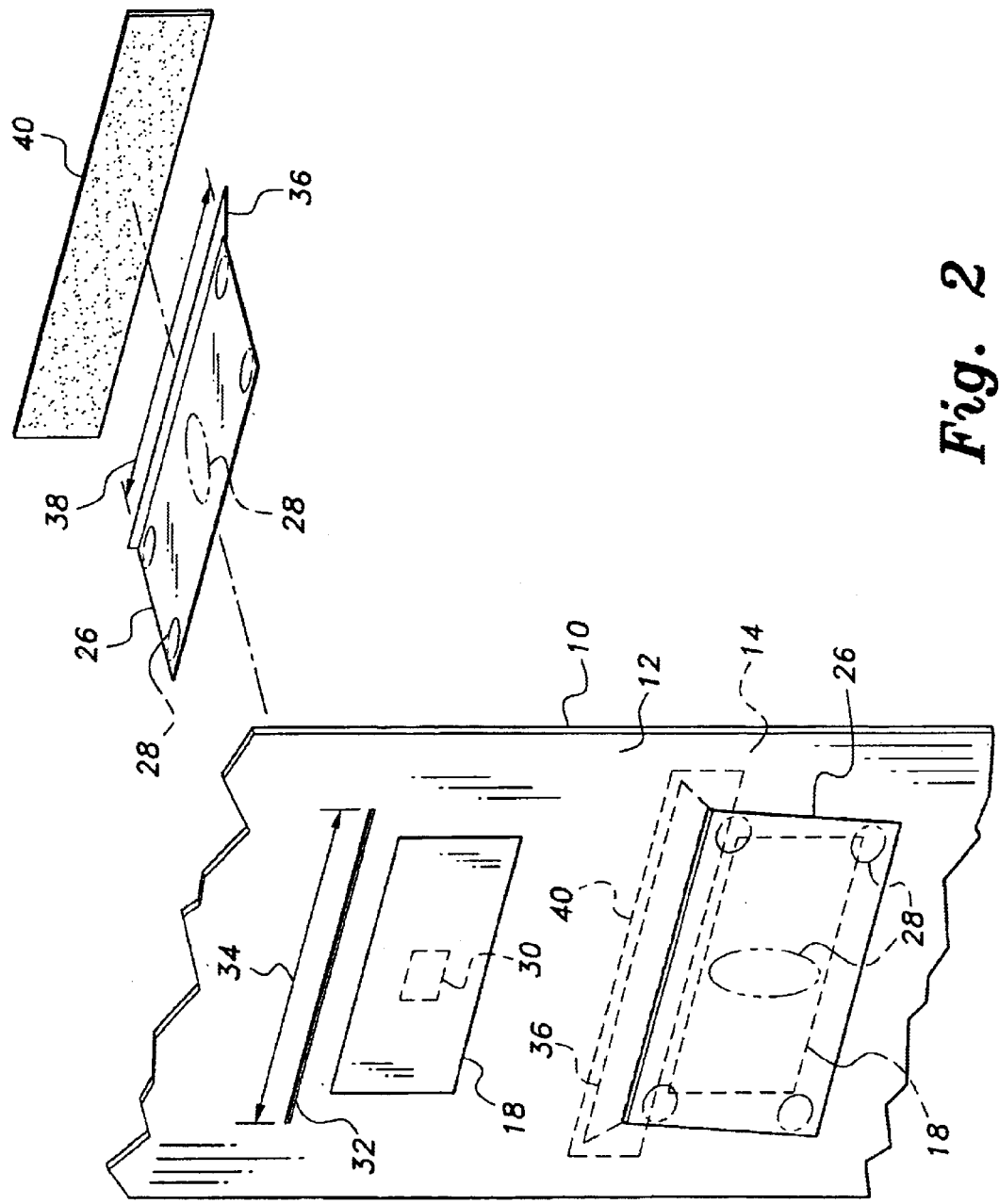
FIG. 2 is an exploded, broken away detail perspective view of a portion of the game board of FIG. 1, showing the installation of exemplary cover flaps on the game board.

FIG. 2 provides an illustration of the installation of the statements 18 and cover flaps 26 on the board 10. Each of the statements 18 is preferably removably and interchangeably attached to the front surface 12 of the board 10, e.g., by a portion of tape 30 having a relatively low adhesive coefficient. The game master or person operating the present game may quickly and easily remove and replace statements 18 on the board 10 as desired, as at the end of each round of play or other interval as desired. The title statements or category headings 22a through 22f may be secured to the board 10 in a similar manner, for quick and easy replacement as needed.

The cover flaps 26 are secured to the board 10 as shown in FIG. 2. The cover flaps 26 are inserted from the rear surface or side 14 of the board 10, through a corresponding series of horizontally disposed slots 32 in the board 10. Each of the slots 32 is formed immediately above one of the row and column positions for placement of the statements 18 on the board 10. Each of the slots 32 has a horizontal length 34 which is preferably slightly longer than the width of the statement panel 18 thereunder, and essentially equal to, or very slightly greater than, the width of the main portion of the corresponding cover flap 26. Each of the flaps 26 is formed of a relatively thin, stiff sheet of material, e.g., a plasticized sheet of paper or the like. Each flap 26 has a relatively wider upper edge 36, which has a width 38 somewhat greater than the length 34 of the slot 32. The flaps 26 are inserted through the slots 32 from the rear surface 14 of the board 10, and are captured in the slots 32 and prevented from passing completely therethrough by the relatively wider upper edge portion 36, which cannot pass through the shorter length 34 of the slot 32. The upper edge portion 36 of each cover flap 26 is secured essentially flush with the rear surface 14 of the board 10, e.g., by a length of adhesive tape 40 or the like. The cover flaps 26 are preferably formed of a thin, flat, relatively stiff material, e.g., a plasticized paper or thin sheet of plastic, etc. This assures that the main portion of each cover flap 26 will be urged downwardly over the corresponding statement 18 to conceal the statement, due to the upper edge portion 36 of the cover flap 26 being secured flat against the back surface 14 of the board 10 and the stiffness of the cover flap 26 material.

Referring back to FIG. 1, the present game is played by players independently approaching the board 10, lifting one or more of the cover flaps 26 as desired, and reading the statement(s) 18 beneath the lifted cover flap(s) 26. The player then writes down the response (in the form of a question, for a Jeopardy!® type game) on a response or answer sheet 42, with a supply of unused response sheets 42 being provided in a first receptacle 44 on the board 10, or other convenient location. This receptacle 44, or other area of the board 10, may also have a display 46 of the rules for the present game. A second receptacle 48 is provided for placement of completed response sheets 42 therein.

Figure 3:
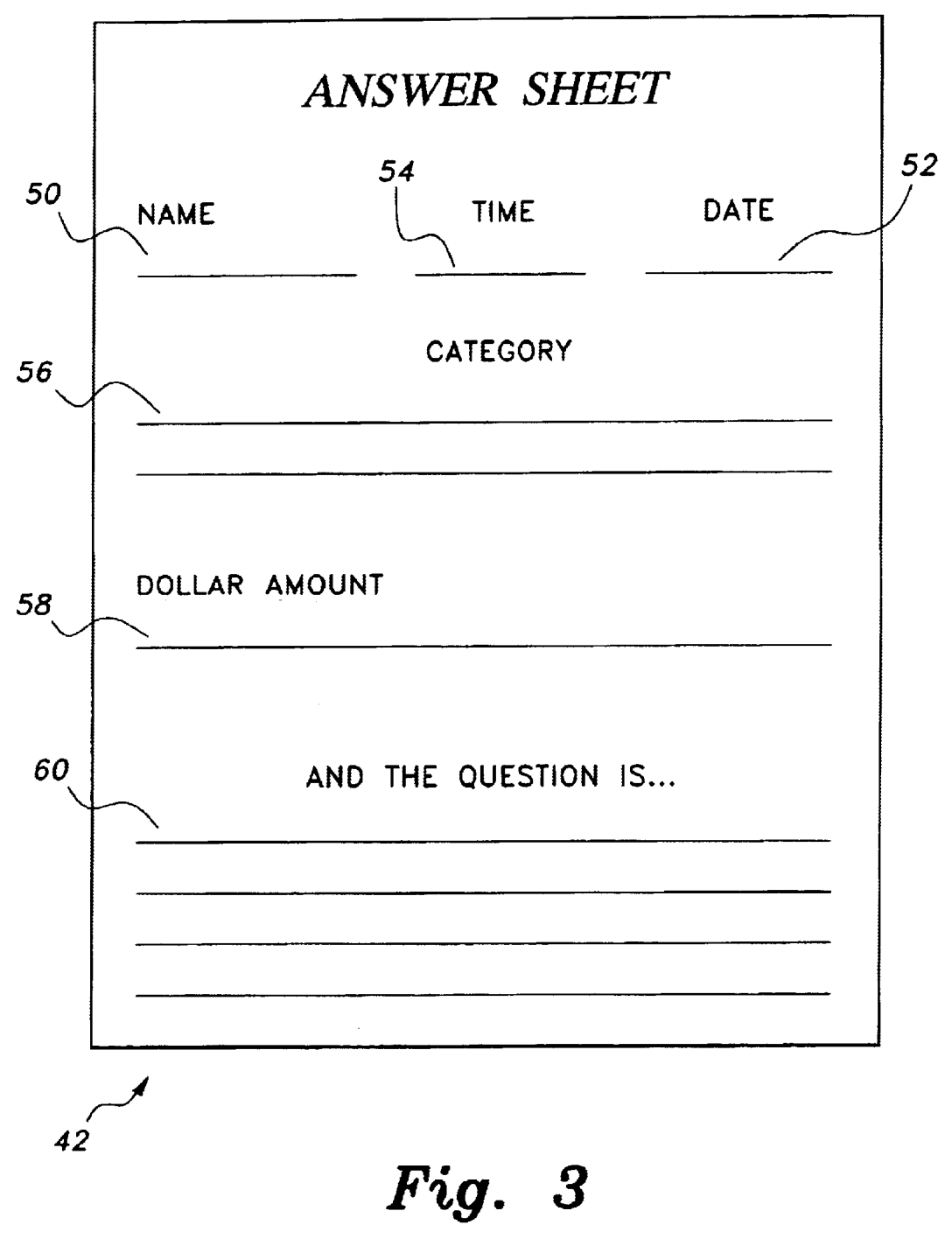

FIG. 3 provides an illustration of an exemplary response sheet 42 which may be used with the present game. Each response sheet 42 includes a series of positions thereon, i.e., a line or area 50 for the player to enter his or her name, places 52 and 54 respectively for entering the date and time of the entry, areas 56 and 58 respectively for entering the category or subject area of the statement selected and the level of difficulty (or "dollar amount," where the degrees of difficulty are represented by simulated currency on the cover flaps 26), and of course an area 60 where the player may enter a response to the statement selected. The response sheet may be revised or modified as desired from the exemplary sheet 42 illustrated, so long as places are provided for the player to record the required information.

It is anticipated that several rounds of the present game would be played over an extended period of time, with the person responsible for the game periodically exchanging the statements 18, and perhaps the subject areas or categories and their corresponding title statements or descriptions 22a through 22f. As the statements 18 may be changed from time to time, it is important that a player note the date and time of his or her response in the appropriate locations 52 and 54 on their response sheets 42. The game board 10 preferably includes areas 62, 64, 66 for noting respectively the number of the current round of play, and the beginning and ending dates for that round of play, as illustrated on the exemplary game board 10 of FIG. 1. Thus, players are informed as to which round of play they have entered, and when a new round of play with new statements begins. These round of play and beginning and ending date indicator areas 62 through 66 may be simple adhesive notes or erasable marker on an appropriate surface, or may be provided in a more technologically sophisticated manner, if so desired (e.g., electronic display where electrical power is available, etc.). While the present game does not require any electrical power for its operation or play, additional decorative lighting 68 may be installed about the periphery 16 of the board 10 in the form of a peripheral string of lights, and/or other lighting about other areas of the board 10 as desired, to attract greater attention to the game where electrical power is available.

The present game is primarily directed to an enjoyable and entertaining means of assisting professionals in a given field (e.g., nursing and/or medicine) to upgrade their professional knowledge, to facilitate the gathering of new and additional knowledge in the field, and to assist in providing the knowledge required to meet any additional professional training which may be required in a given professional field. Accordingly, the statements provided preferably relate to technical matters of interest and/or importance to those professionals working in the professional field to which those statements in the game are directed. In order to facilitate the "grading" of the responses by players, a series of appropriate responses may be provided with each statement or question with only one of the responses being correct, i.e., a multiple choice format. The player need only read the statement and corresponding responses, and enter the appropriate response (perhaps in the form of a question, where such a format is used) on his or her response sheet, rather than attempting to formulate a short, essay—type response for a statement where no selection of responses are provided with the statement. The following table provides a series of exemplary statements and corresponding responses. These statements and responses are directed toward the nursing and medical profession, but other statements and responses directed to other professional fields may be developed, as noted further above.

TABLE I

EXEMPLARY CATEGORIES, STATEMENTS, AND RESPONSES

| CATEGORY | STATEMENT | RESPONSES |
|---|---|---|
| "Body Language" (Signs and and Symptoms) | One of the following potentially serious complications could occur with therapy for hypothyroidism. | (1) What is acute hemolytic reaction? (2) What is angina or cardiac arrhythmia? (3) What is retinopathy? (4) What is thrombocytopenia? |
| "A Lot of Hot Air" (Pulmonary Problems) | One of the following is the best description of Fio2 | (1) What is the molecular weight of oxygen? (2) What is the percentage of oxygen during inspiration? (3) What is the amount of oxygen during inspiration? (4) What is the fraction of oxygen vs. carbon dioxide during inspiration? |
| "The Electrolyte Orchestra" (Problems occurring due to sodium, potassium, magnesium, etc. imbalance) | One of the following is NOT a likely cause of metabolic alkalosis. | (1) What is loss of hydrochloric acid due to vomiting? (2) What is hyperventilation? (3) What is excessive use of diuretics? (4) What is IV administration of sodium bicarbonate? |

It will be noted that each of the statements is worded as a declaratory statement, rather than as a question. The multiple responses to each statement are worded as questions, in keeping with the Jeopardy!® format from which the present game has been developed. The above categories, statements, and responses to those statements are but a small sampling of the myriad subject areas, statements, and responses which may be developed in the field of nursing and medicine for the present professional educational game. The above subject categories, statements, and responses may be expanded upon as desired, to provide a complete matrix of rows and columns of statements and responses for a number of rounds of the game. Subject categories may be given a humorous title (e.g., "And the Beat Goes On," for the cardiac field, and the exemplary subject categories of Table I above), perhaps with an accompanying explanatory description, as desired.

Figure 4:
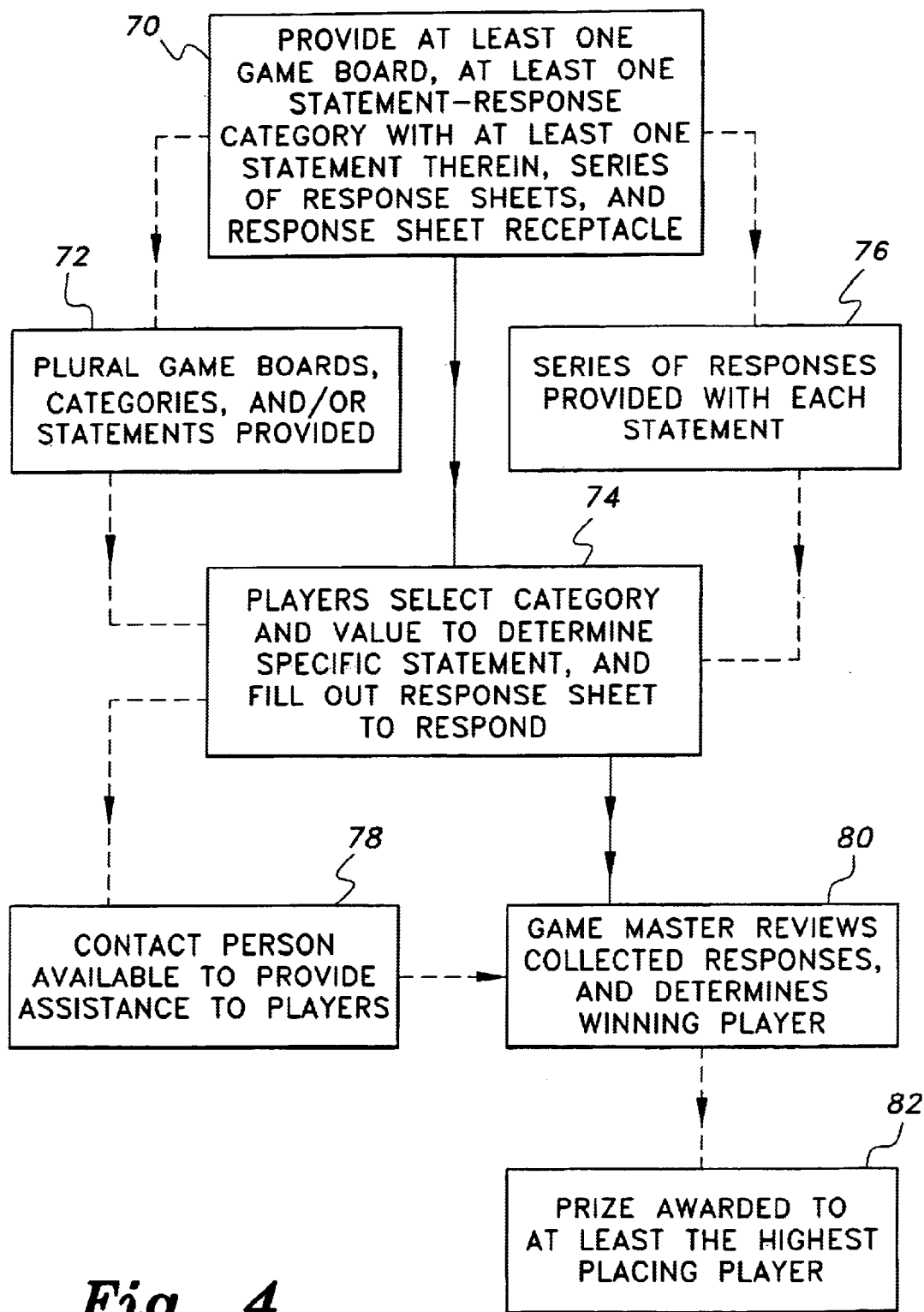
FIG. 4 is a basic flow chart showing the basic steps in the method of play of the present professional educational game.

FIG. 4 provides a flow chart describing the basic steps in the method of play of the present professional educational game. The game board 10, statement-response categories 22a through 22f, statements 18, response sheets 42, and response sheet receptacles 44 and 48, have been described in detail further above and are illustrated in FIGS. 1 through 3 of the drawings. This is noted in the first step 70 of the flow chart of FIG. 4. The game board 10 and the remainder of the game apparatus may be erected in any suitable location, e.g., an employee lounge, or even in an area having public access. It is important that the game apparatus be erected in an area which is accessible to all persons who may wish to take part in the game, regardless of their work schedules. The present professional educational game may be played in an unstructured, somewhat open-ended manner by players playing independently of one another at various times, as desired. In fact, many players may not even see or know one another, due to different shifts and work schedules. The structure of the present game enables different players to respond to the same statements; the statements are not "used up," as they are with most games and game shows. The present game also permits more than one game board to be set up if so desired, with different game boards being erected in different wards, departments, facilities, etc., as desired, generally as indicated by the optional second step 72 in FIG. 4. These different boards may have identical questions and categories thereon, or may have different questions and categories tailored to the specific professional or technical area of expertise of the ward or department in which the board is erected.

Once the board or boards have been deployed, players may play at any time they wish, in accordance with their work schedules, as noted further above. The present game does not require players to assemble at any one time for play; it is only necessary that the players be able to physically reach the game board for play, with the board preferably being accessible at any time there are staff or employees present. The present game may be accessible twenty-four hours a day and seven days a week, for establishments such as hospitals and similar facilities which are in operation around the clock.

Play is initiated by individual players who take one of the blank response sheets 42 and fill it out in accordance with the lines or positions provided on the sheet. Players must enter at least their names, and where different rounds of play are provided, the time and date of the entry so the game master can identify the round of play to which the response was made. The player also enters the category or subject area and the degree of difficulty (or simulated "dollar amount") of the selected statement, lifts the cover flap, reads the statement and responses, enters a response, and places the completed response sheet in the second receptacle, generally in accordance with the exemplary statement form 42 illustrated in FIG. 3. This is indicated generally by the third step 74 of FIG. 4. Where no choice of responses is provided with each of the statements, the player must formulate his or her own short, essay—type response. However, it is preferred that each statement be provided with a series of response choices, with only one of those choices being correct (or most correct), generally as indicated by the optional step 76 in FIG. 4. This facilitates the "grading" of the responses by the game master, as well as assisting the knowledgeable player in determining the correct response. Where an answer—question format is used, the player need only reword the selected response in the form of a question, if this has not already been done.

It is intended that the statements be somewhat difficult and challenging to the players, in order to cause the players to expand their knowledge base. Accordingly, there will be many instances where players do not know the correct response to a given statement or statements. The present game provides assistance in such circumstances, by designating an expert contact person to assist players with questions about the game, generally as indicated by the optional fifth step 78 of FIG. 4. Preferably, an expert will be designated for each of the subject areas or categories of play, and for each shift or period during which the game will be played. Experts will guide players in their search for the correct response by noting texts, manuals, periodicals, websites, etc. which contain the information being sought by the player. As has been noted further above, the intent of the present game is to increase the knowledge of the players in an entertaining and pleasant manner.

Play continues as described above for the duration of the predetermined round of play as determined by the game master, i.e., the person responsible for the game, and indicated in the beginning and ending round date positions 64 and 66 on the game board 10 illustrated in FIG. 1. At the end of the round, the game master collects the completed response sheets 42 from the receptacle 48 (this may be done periodically during the round), and evaluates the responses entered on the response sheets. The player having the greatest number, or perhaps highest percentage, of correct responses, is designated as the winner of the round, generally as indicated in the sixth step 80 of FIG. 4. Scoring may also consider the degree of difficulty of the statements responded to, corresponding to the simulated value of each statement. Optionally, those players having the second, third, etc. best scores may be recognized correspondingly. The winning player, or highest placing few players, may be awarded some form of prize (trophy, plaque, merchandise, cash, etc.) depending upon the resources of the facility operating the game, as indicated in the optional seventh step 82 of FIG. 4. Again, the primary point of the present game is to encourage continuing professional education and expansion of professional knowledge. Hence, any prizes awarded preferably serve as recognition to the recipient, rather than to provide significant material or financial gain.

Prizes, awards, and/or other recognition may be granted to winning players at the end of each round of play, with each new round beginning a new game. The previous statements/categories are removed from the board, and new statements/categories are placed upon the board for each new round. Alternatively, a series of preliminary rounds of play may be held, with the preliminary rounds leading up to a final round. Where this format is used, all scoring achieved in earlier preliminary rounds carries over to the final round. The lengths of the rounds of play are somewhat arbitrary, and may be set in accordance with the wishes of the game master, perhaps with input from the players. It is preferable that each round last sufficiently long as to assure an equal opportunity of access by all those who wish to play, regardless of their work schedules and days off.

In conclusion, the present professional educational game serves to greatly facilitate continuing professional education for nurses and others in the medical field, and may be adapted to virtually any professional field by developing an appropriate series of statements and corresponding responses. The present game makes it fun for professionals to keep up with new knowledge in their fields, as well as to refresh their memories regarding previously learned material. The competitive aspect of the present game also appeals to many persons, and may encourage them to put forth more effort toward the completion of a successful round. As the present game is relatively unstructured, players may participate in accordance with their free time on breaks, lunch periods, etc., with relatively little time pressure being placed upon players. The present game is a very economical means for players to expand their technical and professional knowledge, in comparison to books and other educational materials, conferences, seminars, clinics, etc. The present game also recognizes and rewards successful players for their efforts, which is important in encouraging persons to continue to expand their knowledge. The present game provides a low stress means of providing necessary information to persons who need that information, and encourages cooperation between players who may have knowledge to exchange, as well. The present game can also assist management and administration in recognizing weak areas of knowledge in a professional staff, so that management can fortify those areas and assist the staff in further training. Finally, the present professional educational game can result in more accurate professional performance and fewer errors by a professional staff, which can be critical in many professions.

It is to be understood that the present invention is not limited to the embodiments described above, but encompasses any and all embodiments within the scope of the following claims.

I claim:

1. A professional educational game for independent play by a plurality of players, comprising:

a large game board having a front surface, a back surface opposite said front surface, and a periphery;

a plurality of rows and columns of statements, disposed upon said front surface of said game board;

a plurality of liftable cover flaps secured to said game board, with each of said cover flaps being positioned over and normally concealing a corresponding one of said statements;

a plurality of response sheets;

a plurality of positions for entering at least a player's name and response to a selected one of said statements, disposed upon each of said response sheets; and a horizontally disposed slot immediately above each of said statements, with each said slot further having a length;

each of said cover flaps further includes an upper edge portion having a width greater than the length of each said slot;

each of said cover flaps being installed through a corresponding said slot from the back surface of said game board, with each of said cover flaps concealing a corresponding one of said statements and with said upper edge portion of each of said cover flaps captured behind said game board;

said upper edge portion of each of said cover flaps being secured to said back side of said game board.

2. The professional educational game according to claim 1, further including:

a plurality of responses disposed immediately adjacent each of said statements, the plurality of responses including a single correct response.

3. The professional educational game according to claim 1, wherein:

said columns of statements have different subject areas from one another;

each of said columns of statements is headed by a title statement briefly describing one of said different subject areas of the corresponding one of said columns of statements;

said rows of statements have different degrees of difficulty from one another; and said rows of statements are arranged according to said degrees of difficulty.

4. The professional educational game according to claim 3, wherein:

said cover flaps further include indicia imprinted thereon representing a plurality of denominations of simulated currency thereon; and said degrees of difficulty of said rows of statements are indicated by increasing denomination values of said simulated currency of said cover flaps.

5. The professional educational game according to claim 3, wherein:

each of said statements is removably and interchangeably attached to said front surface of said game board; and each of said title statements is removably and interchangeably attached to said front surface of said game board.

6. The professional educational game according to claim 3, wherein said response sheets further include positions for entering at least one of said subject areas of said columns of statements, and for entering at least one of said degrees of difficulty of said rows of statements.

7. The professional educational game according to claim 1, wherein said response sheets further include positions for entering the time and date.

8. The professional educational game according to claim 1, further including:

a first receptacle disposed upon said front surface of said game board, for containing unused response sheets; and a second receptacle disposed upon said front surface of said game board, for containing completed response sheets.

9. The professional educational game according to claim 1, further including a decorative lighting system disposed at least about said periphery of said game board.

10. A professional educational game for independent play by a plurality of players, comprising:

a large game board having a front surface, a back surface opposite said front surface, and a periphery;

a plurality of rows and columns of statements, disposed upon said front surface of said game board;

a plurality of liftable cover flaps secured to said game board, with each of said cover flaps being positioned over and normally concealing a corresponding one of said statements;

a plurality of response sheets;

a plurality of positions for entering at least a player's name and response to a selected one of said statements, disposed upon each of said response sheets;

a round of play indicator disposed upon said front surface of said game board;

a round beginning date indicator disposed upon said front surface of said game board; and a round ending date indicator disposed upon said front surface of said game board.

11. A method of playing a professional educational game, comprising the following steps:

(a) providing a large game board having a front surface, a back surface opposite the front surface, and a periphery;

(b) further providing a plurality of rows and columns of statements, disposed upon the front surface of the game board;

(c) further providing a plurality of liftable cover flaps;

(d) positioning each of the cover flaps over a corresponding one of the statements, and concealing the statements therebehind;

(e) further providing a first response sheet receptacle disposed upon the front surface of the game board;

(f) placing a plurality of unused response sheets within the first response sheet receptacle;

(g) further providing a second response sheet receptacle disposed upon the front surface of the game board;

(h) further providing a plurality of positions for entering at least a player's name and response to a selected one of the statements, disposed upon each of the response sheets;

(i) selecting one of the response sheets by each player independently of one another, and writing the name of the corresponding player on the response sheet;

(j) lifting one of the cover flaps and reading the statement disposed thereunder, by a player;

(k) writing a response to the statement on the response sheet for that player;

(l) placing the completed response sheet in the second response sheet receptacle;

(m) defining a beginning and an ending point for play of the game;

(n) reviewing the completed response sheets, after the ending point of the game; and (o) recognizing the player who responds correctly to the greatest number of statements, according to the completed response sheets.

12. The method of playing a professional educational game according to the method of claim 11, further including the steps of:

(a) providing a plurality of responses disposed immediately adjacent each of the statements; and (b) providing a single correct response disposed with each of the plurality of responses of each of the statements.

13. The method of playing a professional educational game according to the method of claim 11, further including the steps of:

(a) providing a series of different subject areas for the statements;

(b) arranging each of the columns of statements according to subject area;

(c) providing a title statement corresponding to the subject area of each of the columns, heading each of the columns of statements;

(d) providing a series of different degrees of difficulty for the statements; and (e) arranging each of the rows of statements according to degree of difficulty.

14. The method of playing a professional educational game according to the method of claim 13, further including the steps of:

(a) providing a plurality of different denominations of simulated currency upon the cover flaps; and (b) arranging the plurality of different denominations of the cover flaps according to the degrees of difficulty of the statements in each of the rows of the game board.

15. The method of playing a professional educational game according to the method of claim 13, further including the steps of:

(a) attaching each of the statements removably and interchangeably to the front surface of the game board; and (b) attaching each title statement removably and interchangeably to the front surface of the game board.

16. The method of playing a professional educational game according to the method of claim 13, further including the steps of:

(a) providing positions upon the response sheets for entering at least one of the subject areas of the columns of statements; and (b) providing positions upon the response sheets for entering at least one of the different degrees of difficulty of the rows of statements.

17. The method of playing a professional educational game according to the method of claim 13, further including the steps of:

(a) designating at least one expert assistant in at least one of the subject areas of the statements; and (b) directing players to the expert assistant for assistance in responding to statements as required.

18. The method of playing a professional educational game according to the method of claim 11, further including the steps of:

(a) providing round of play, round beginning date, and round ending date indicators upon the front surface of the game board; and (b) providing positions upon the response sheets for entering the time and date of play.

19. The method of playing a professional educational game according to the method of claim 11, further including the step of providing a decorative lighting system disposed at least about the periphery of the game board.

* * * * *